United States Patent
Thrash

(10) Patent No.: US 7,726,070 B2
(45) Date of Patent: Jun. 1, 2010

(54) HYDRATION MAINTENANCE APPARATUS AND METHOD

(76) Inventor: Tommy K. Thrash, 302 Vicksburg Ave., Lubbock, TX (US) 79416

( * ) Notice: Subject to any disclaimer, the term of this patent is extended or adjusted under 35 U.S.C. 154(b) by 0 days.

(21) Appl. No.: 12/324,608

(22) Filed: Nov. 26, 2008

(65) Prior Publication Data

US 2009/0145025 A1   Jun. 11, 2009

Related U.S. Application Data

(60) Provisional application No. 61/012,912, filed on Dec. 11, 2007.

(51) Int. Cl.
*A01B 79/00* (2006.01)
(52) U.S. Cl. .................................. 47/58.1 R
(58) Field of Classification Search ............. 47/58.1 SC
See application file for complete search history.

(56) References Cited

U.S. PATENT DOCUMENTS

| | | | |
|---|---|---|---|
| 2,765,291 A * | 10/1956 | Horne | 523/132 |
| 3,336,129 A * | 8/1967 | Herrett et al. | 504/360 |
| 3,648,631 A | 3/1972 | Fiedler et al. | |
| 3,973,355 A | 8/1976 | McKenzie | |
| 4,104,824 A * | 8/1978 | Lundberg et al. | 47/58.1 R |
| 4,540,427 A * | 9/1985 | Helbling | 71/27 |
| 4,579,578 A * | 4/1986 | Cooke | 71/11 |
| 5,013,349 A * | 5/1991 | Tanaka | 71/27 |
| 5,394,812 A | 3/1995 | Dunning et al. | |
| 5,450,985 A | 9/1995 | Meuleman | |
| 5,794,550 A | 8/1998 | Chadwick | |
| 6,395,051 B1 | 5/2002 | Arnold et al. | |
| 6,669,752 B2 | 12/2003 | Arnold et al. | |
| 2003/0046865 A1 | 3/2003 | Nishiyama | |
| 2004/0023809 A1 * | 2/2004 | Wertz et al. | 504/360 |
| 2004/0074271 A1 * | 4/2004 | Krysiak et al. | 71/27 |
| 2007/0074315 A1 | 3/2007 | Collin | |
| 2009/0145025 A1 * | 6/2009 | Thrash | 47/48.5 |

* cited by examiner

*Primary Examiner*—Francis T Palo
(74) *Attorney, Agent, or Firm*—Pate Pierce & Baird

(57) ABSTRACT

A material for maintaining hydration in plants, whether potted or in natural soils may include a substrate treated with a binder, securing a layer of hydrating particles thereto. Typical binders may include lignicite, or other naturally occurring materials such as sugars, molasses, corn syrup, gelatin, or the like. A byproduct of wood, lignicite has been found to be very effective. Various materials can serve as a hydrating, particulate coating. Polyacrylamide has been found to serve well and provide relief from the stress of dehydration that normally occurs in plants between waterings.

20 Claims, 2 Drawing Sheets

HYDRATION MAINTENANCE APPARATUS AND METHOD

RELATED APPLICATIONS

This application claims the benefit of U.S. Provisional Patent Application Ser. No. 61/012,912, filed on Dec. 11, 2007.

BACKGROUND

1. The Field of the Invention

This invention relates to horticulture and, more particularly, to novel systems and methods for maintaining hydration of plants.

2. The Background Art

Different types of soils perform their functions differently. In particular, rocky soils, sandy soils and the like tend to pass water too freely. Likewise clay soils tend to hold water, but yet not permit the water to distribute therethroughout. Typically, organic soils having substantial amounts of loam formed by organic matter such as leaves, other foliage, decaying plant matter, and the like provide better absorption and holding of water.

In general, soil may be improved on a small scale by addition of organic matter such as peat moss. On a large scale, soils are typically improved by growing and plowing under certain plants selected for their addition of organic matter. Likewise, waste materials from corrals, grain stalks (straw) and the like may be plowed into tracts of land in order to improve their organic content and their capacity to hold water for use by plants.

Gelatin is a naturally occurring polymer. Gelatin binds with water to form a "gel." The existence of naturally occurring polymers such as gelatin has been augmented by the development of synthetic polymers. One such polymer is polyacrylamide. Polyacrylamide (PAM) and other similar gels have been used for different types of binding processes. For example, a gel, when wet, may be easily formed, and when dry may become something of a glue or binder. Likewise, gels typically are formed of long polymers and thus are often durable in the face of erosive actions such as water running over them. Accordingly, gels such as PAM have been used to treat surfaces of ground in order to minimize erosion by the passing of water thereover.

Horticulture is the culture of plants. Plants rely on water as a transport mechanism in order to draw nutrients from the ground into the plants through the roots and into the stems, leaves, and so forth. Likewise, water acts as a transpiration cooling mechanism by evaporation out through the leaves and other foliage of a plant.

Thus, the health of plants depends upon access to water. Many parts of the United States, and even indoor plant locations such as malls, homes, offices, and the like, receive little or no rainfall. Irrigation or periodic watering by some mechanism is often required. In such situations, plants may dwell for an extended period without additional water. Organic soils improve the water holding capacity around such plants. Nevertheless, evaporation and periodic watering may still combine to put stress on plants.

It would be an advance in the art to provide a mechanism whereby to automatically store within a soil, such as near a plant root, near a rootball of a plant, within a pot or indoor planter, or the like, a mechanism to absorb water, releasing it over time while resisting evaporation.

BRIEF SUMMARY OF THE INVENTION

In view of the foregoing, in accordance with the invention as embodied and broadly described herein, a method and apparatus are disclosed in one embodiment of the present invention as including a substrate, which may be formed of sand, rock, or organic material, provided with a binder to temporarily or permanently secure a hydrating polymer such as polyacrylamide (PAM) in proximity to the substrate. In certain embodiments, such as where a potted plant may have a transparent vessel or pot in which it is held, pigment may be added to the polymer, to the binder, or to the surface of the substrate by any suitable mechanism. Thus, the hydration maintenance material may be configured as a decorative or identifying element on its own or for a potted plant, for example.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
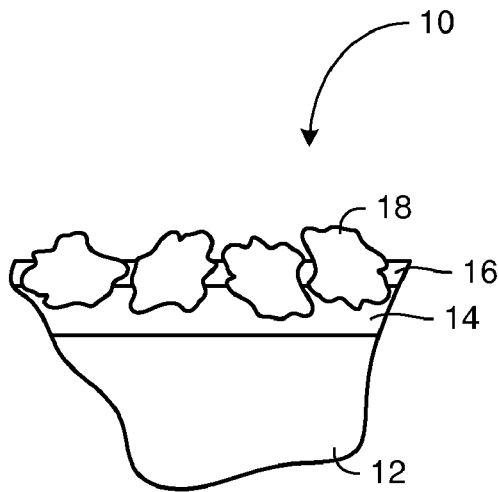
FIG. 1 is a schematic cross-sectional view of a material including a substrate provided with a binder securing a hydrating polymer thereto in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a material 10 in accordance with the invention may include a substrate 12 formed of a suitable material for placement in the vicinity of a root system of a plant. For example, a substrate may be a particle of sand. In certain embodiments, even gravel or rock in a potting environment may operate as a substrate. In some embodiments, a substrate may be formed of organic or inorganic material. Nevertheless, it has been found effective to use sand as a substrate 12 inasmuch as it is submersible in water and will not float as many organic materials will when dry. Likewise, the sand as substrate 12 is comminuted to such a small size that interstices between individual grains of the sand substrate 12 provide ample space and minimum distance for water to surround each of the substrate 12 particles.

In the illustrated embodiment, a binder 14 may be distributed as a comparatively thin layer on the surface of the substrate 12. Typical materials for binders may include both temporary and permanent binders 14. Temporary binders may be sugar-based or other water soluble materials. For example, corn syrup, molasses, and the like may form temporary binders. In the presence of water, such material may ultimately dissolve. Nevetheless, so long as the substrate 12 is not turned, mixed, or otherwise disturbed significantly, any other materials supported by the binder 14 would not be expected to dislocate.

Otherwise, certain naturally or synthetically occurring polymers may also be used as a binder 14. Lignicite may be used as a binder 14. Lignicite is a byproduct of wood, and provides material having good adhesive properties, and substantial permanence as a binder 14 on a substrate 12.

Other polymers may be used to form a binder 14. For example, various materials used as glues, including mucilage, gelatin, other water soluble polymers including, for example, Elmer's™ glue, and the like may also operate as binders 14 to bind materials to a substrate 12.

In certain embodiments, the substrate 12 may be used in soils in outdoor environments. In other situations, the substrate 12 may be implemented in indoor pots and planters. In other embodiments, the substrate 12 may be used as a filler material in planters or pots having transparent or translucent walls. In such embodiments, a pigment 16 may be added. Likewise, even if the substrate 12 and its contents bound thereto by the binder 14 are not to be seen, they may be pigmented with an appropriate pigment 16 simply for the purpose of identification during selection, scale, or installation. Accordingly, a pigment 16 may be provided.

The pigment 16 may be implemented in any of several manners. For example, the substrate 12 may have pigment 16 applied prior to the application of the binder 14. In alternative embodiments, the pigment 16 may actually be included in the binder 14, which becomes a pigmented coating on the substrate 12. In yet other embodiments, the pigments 16 may be added to a hydration particle 18 either as a pigment 16 mixed therein, or as a pigment 16 applied as a coating thereto. Thus the location of the pigment 16 in the Figures is schematic and may take alternative location or application method.

Particles 18 of a hydrophilic material may be bonded to the substrate 12 by the binder 14. Particles may be sized to substantially coat or periodically coat the substrate 12.

In certain embodiments, the hydrophilic material 18 may be a powdered polymeric material 18 such as polyacrylamide. In other embodiments, the particles 18 may actually be organic material having capillary action to readily absorb and hold water. In one presently contemplated embodiment of an apparatus in accordance with the invention, the particles 18 may be powdered polymeric material in a dehydrated state, and having a capacity to absorb water, typically many times the weight of a particular particle 18.

The substrate 12, in certain embodiments, may be sand. The sand will typically be cleaned and washed to remove dust and organic material that may inhibit the binder 14 from being effective. Likewise, the substrate 12 may be sized of any suitable size. For example, sand particles may range from much less than a millimeter in effective diameter or distance thereacross to approximately two millimeters across. Very coarse sands may have even larger effective diameters. Likewise, in certain embodiments, gravel of various sizes may operate as a substrate 12. However in one presently contemplated embodiment, washed and dried sand such as is used in construction, such as in concrete, has been found to be suitable. Fine sands such as masonry sands tend to be smaller, and also can function suitably in accordance with the invention.

Accordingly, the distance across each particle 18 may be selected to provide an effective coating of powdered particles 18 on the substrate 12. In one presently contemplated embodiment, the effective diameter of the particles 18 may be from about a 30 mesh size to about a 100 mesh size. For example, a sieve system for classifying particles has various mesh sizes. A size of about 30 mesh, able to pass through a 30 mesh sieve, (i.e., about 0.6 mm) has been found suitable. Likewise, powdering the particles 18 to a size sufficiently small to pass through a 100 mesh (i.e., about 0.015 mm) sieve is also satisfactory. A mesh size of from about 50 mesh to about 75 mesh is an appropriate material to obtain excellent adhesion of particles 18 in the binder 14, with a suitable size of the particles 18 to absorb significant liquid at the surface of the substrate 12.

As a practical matter, about half the volume of a container containing a substrate 12 as particulate matter will be space, interstices between the granules of the substrate 12. One advantage of using materials such as sand as the substrate 12 is that a coating of the particles 18 may provide a substantial volume of water once the particles 18 are fully saturated. By contrast, where the size of the particles 18 is too many orders of magnitude smaller than the effective diameter or size of the substrate particles 12, less of the space between the substrate particles 12 is effectively used for storing water. Thus, sand as a substrate 12 coated by particles 18 of a hydrophilic material such as a polymer will provide substantial space between the substrate particles 12 to hold water-laden particles 18.

The diameter of the particles 18, or the effective diameter thereof, is typically within about an order of magnitude (e.g., 10×) smaller than the effective diameter of the particles of the substrate 12. This order of magnitude may be changed. For example, the order of magnitude difference less than about 1 order of magnitude (i.e., 10×) may still be effective. Similarly, an order of magnitude difference of 2 (i.e., 100×) may also function.

However, with particles 18 too much smaller than an order of magnitude smaller than the effective diameter of the substrate 12, the interstitial space may not be as effectively used. Likewise, with an effective diameter of particles 18 near or larger than about 1 order of magnitude smaller than the size of the particles of the substrate 12, binding may be less effective and the particles 18 may interfere more with the substrate itself as well as the flow of water through the interstitial spaces needed in order to properly hydrate a material 10.

Figure 2:
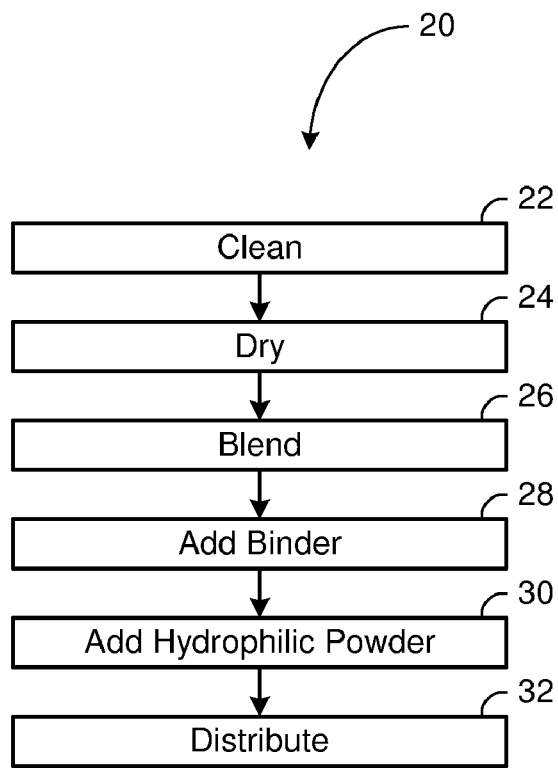
FIG. 2 is a schematic block diagram of one embodiment of a process for formulating and producing a hydrating material in accordance with the invention.

Referring to FIG. 2, an embodiment of a process for formulating the material 10 may involve cleaning 22 the material of the substrate 12. Likewise, the material of the substrate 12 may be dried 24 to make it more effective in receiving a binder 14. The material of the substrate 12 may then be blended 26.

One embodiment, a ribbon blender provides an effective mechanism to perform continuous blending as the binder 14 is added 28. Other types of mixers, such as rotary mixers, and the like may be used. However, a ribbon blender provides a blending 26 that is effective to distribute binder 14 as it is added 28.

For example, if an individual particle of the substrate 12 receives too much binder 14, and thus begins to agglomerate with other particles of the substrate 12, a ribbon binder will tend to separate the particles as a natural consequences of its shearing and drawing action during blending 26.

As the binder 14 is added 28 to the mixture being blended 26, the individual particles of the substrate 12 will be substantially evenly coated. At this stage, the binder 14 may also be heated in order to reduce its viscosity and improve blending. Likewise, the material of the substrate 12 or the environment of the blending 26 may be heated in order to improve the evenness of the distribution of the binder 14 on the surfaces of the substrate 12 materials or particles 12.

Blending 26 of the binder 14 into the material of the substrate 12 is complete when coating is substantially even, and the texture of the material 10 has an ability to clump, yet is easily crumbled and broken into individual particles. At that point, addition 30 of the hydrophilic particles 18 may be accomplished.

For example, adding 30 the particles 18 as a powder into the blending 26 is a naturally stable process. Typically the particles 18 attach to the binder 14 of the substrate 12 particles, thus removing from activity that location. Accordingly, other particles 18 rather than agglomerating with their own type of material will continue to tumble in the blending 26 until exposed to a suitable location of binder 14 of the substrate 12. Thus, the adding 30 of the particles 18 or powder 18 of hydrophilic material will tend to be a naturally stable process providing a substantially even coating on all the particles of the substrate 12.

Just as marshmallows are dusted with corn starch, rendering them no longer tacky with respect to one another, the material 10 formulated by the process 20 are dusted with particles 18 and will pour freely. Accordingly, distribution 32 may be conducted in a variety of ways and may include one or several processes. For example, distribution may include marketing distribution from packaging after completion of blending 26, shipping to distributers and retailers, and purchase and application by users.

An important part of distribution 32 is the deployment of the material 10 around the roots of a plant. In one embodiment of an apparatus and method in accordance with the invention, the material 10 may be poured, as if it were simply sand 12 or other substrate 12 alone. Since the powder 18 or particles 18 have substantially occupied the binder 14, the material 10 will not bind to itself, but will readily pour as the initial substrate material 12 will.

Figure 3:
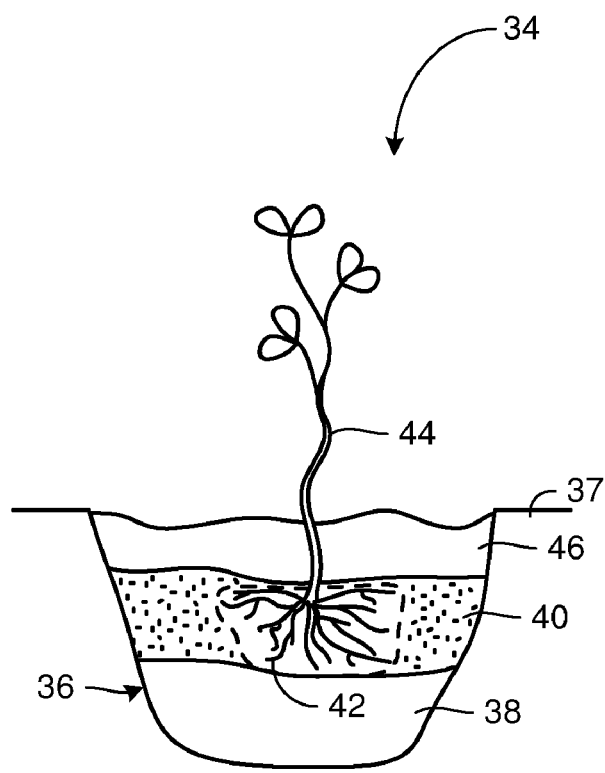
FIG. 3 is a cross-sectional view of one embodiment of one installation of a hydrating material in accordance with FIGS. 1 and 2 implemented to service a plant as a hydrating layer.

Referring to FIG. 3, in one embodiment of an installation 34, distribution 32 may include pouring a layer of the material 10 near a plant. In the illustration of FIG. 3, the process 34 or installation 34 may include a cavity 36 formed in the ground, or by a container such as a pot, planter, or the like. In the illustrated embodiment, the cavity 36 may have a surrounding environment 37 such as the ground. A potting mixture 38 or potting soil 38 may fill a portion of the cavity 36.

For example, one conventional mixture of horticulturists may include a mixture of peat moss or compost along with other drainage materials. For example, gravel, sand, vermiculite, perlite, or the like may be mixed with an organic material such as peat moss or compost in order to provide drainage in addition to the moisture capacity of the organic material.

The material 10 in accordance with the invention may be disposed in a layer 40 poured around a rootball 42 of a plant 44. Accordingly, the layer 40 may provide to the rootball 42, or to individual roots a surrounding environment 40 having both ease of water transport or drainage through the substrate 12 (e.g., sand, etc.) while also having the particles 18 of hydrophilic material to absorb and maintain water within the interstitial spaces between the substrate 12 particles.

Thus, the layer 40 provides a reservoir within the cavity 36 of a material 10 engineered to maintain a high degree of hydration (e.g., water in a gel) that will not drain into the environment 37, nor be readily evaporated out. To this end, a top dressing 46 or a top layer 46 may be laid down on top of the layer 40 in order to provide some protection against evaporation from heat, sun, air, and the like. Thus, the top layer 46 may be formed of the same potting soil or other material of the layer 38 below the plant 44 and the rootball 42. Various suitable top layers 46 exist and are known in the horticulture arts.

For example, mulches, wood chips, synthetic materials, plastic sealing, and the like may be used as a covering layer 46. Inhibiting heat transfer and excessive access to air and heat may assist in reducing evaporation from the layer 40 of the material 10.

Figure 4:
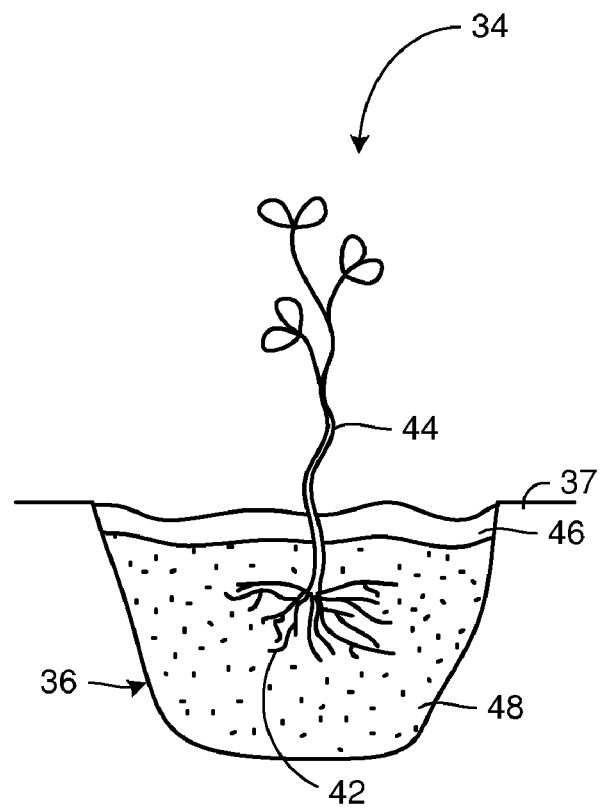
FIG. 4 is an alternative embodiment of an installation in accordance with the invention having the material of FIG. 1 distributed throughout a region surrounding a root system of a plant.

Referring to FIG. 4, an alternative embodiment of an installation 34 may include the cavity 36 and an environment 37 as discussed above. In the embodiment of FIG. 4, the rootball 42 may be surrounded by a distributed mixture 48 or fill 48 that includes the material 10 mixed into another potting soil mixture. For example, in the embodiment of FIG. 4, a potting soil mixture of any suitable combination of materials (e.g., selections from vermiculite, perlite, sand, peat moss, compost, soil, gravel, or the like) may be mixed with the material 10 throughout. A top layer 46 forming a suitable dressing to minimize evaporation from heat or wind may still serve well.

The material 10 may typically include from about 1 percent to about 20 percent of a hydrophilic material 18 or particles 18. The particles 18 may be formed of a naturally occurring material, such as a cellulose, gelatin, organic material, or the like.

In one embodiment, a synthetic gel, such as polyacrylamide may be used for the particles 18, in a ratio of from about 1 to about 20 percent particles 18 compared to the weight of the substrate 12. In experiments, a range of from about 5 to about 10 percent has been found to be the most effective for the amount particles 18.

Sizes of particles 18 may range from about 20 mesh to smaller than 100 mesh. Particles 18 of from about 50 to about 75 mesh have been found most effective.

The binder 14 may typically be in the range of from about in ¼ percent to about 3 percent of the weight of the substrate 12. A range of from about ¾ percent to about 1½ percent has been found to work best. That is, with a binder such as lignicite, ¼ of 1 percent has been found not to provide as reliable binding of particles 18 to the substrate 12. Meanwhile, a ratio of higher than about 3 percent by weight of binder 14 to the amount of a substrate 12, such as sand, when using lignicite as the binder 14, tends to provide too much agglomeration. The pouring ability of the material 10 is inhibited as well as the blending 26, due to agglomeration. Other binders also operate, including several smaller molecules that are water soluble. For example, glues, gelatins, sugars, molasses, and the like may be used as a binder 14.

One substantial advantage for the material 10 in accordance with the present invention is that the material remains flowable as a sand-like material 10 into the area of roots and under a rootball or around the individual open roots of plants being transplanted. Thus, handling and application is simple, and the ability of granular material 10 to flow under and around small interstices between roots or between potting materials provides for a very effective application.

Certain experiments were conducted using the material 10 in accordance with the present invention. For example, in one experiment various sizes of planting pots were used ranging in size from one quart to one gallon, two gallons, and five gallons. Various plants were tested including geraniums, hibiscus, and Indian hawthorn.

In one experiment, a five gallon potting container was half filled with a potting soil mixture of conventional type. Approximately one liter of the material 10 was added as a layer on top of the potting soil. Three geraniums plants where then planted in the material 10. And the remainder of the pot was filled with a potting soil mixture.

The pot was placed where it could drain and was watered liberally with the excess water running out of the drainage apertures in the pot. Four such pots were set up, each having three geranium plants. Four additional pots were set up without using material 10 in a layer 40 around the roots of the plants. All plants were planted and all pots were prepared on the same day. The same amount of water was applied to each of the pots.

After 10 days, the untreated plants lacking the material 10 in the extra layer 40 of the material 10 to hold the water appeared to be extremely stressed. In fact, the plants stressed sufficiently that after 15 days they appeared dead.

Plants potted in the layer 40 of the hydrated material 10 still appeared healthy after 10 days and after 15 days. At 35 days after watering, the plants in the treated pots containing the layer 40 of hydrating material 10 began to appear stressed. Upon watering, they responded well and returned to full hydration and health. The plants in the untreated pots did not recover.

Another test used hibiscus plants with four pots treated with the layer 40 of a hydrating material 10 and four pots untreated. All pots were the same size. The watering process was the same. Thus, as with the geranium experiment, all pots were watered equally.

After 15 days the hibiscus plants that had not been treated with the extra layer 40 of the hydrating material 10 appeared very stressed. After 20 days, the plants in the untreated plots were turning brown.

In contrast, hibiscus plants in the treated pots having an extra layer 40 of hydrating material 10 appeared healthy after 15 days and even out to 22 days, when the hibiscus plants in the untreated plots were in the browning stages of dying.

After 38 days, the hibiscus plants in the treated pots began to show stress. Water was provided to plants at 38 days. The untreated pots were watered the same as the treated pots. Plants in the untreated pots did not respond. The plants in the treated pots responded well and continued living healthily upon the watering at 38 days.

In one experiment, an Indian hawthorn was planted in the ground. About a liter of the material 10 was laid about the roots in a layer 40 as described hereinabove. In this instance, the experiment was conducted in an environment of natural ground. The Indian hawthorn plants were placed in holes approximately 18 inches across by about 15 inches deep. In each instance, the hole 36 prepared for the plant was partially filled with a soil and wetted. Two plants were placed in holes treated with approximately 1 liter of the material 10, each. A control was created by planting two additional Indian hawthorns using each step the same, in preparation of the hole, placement of the soil in the hole, and watering of the soil and the plants. In the control, none of the material 10 was used.

No further water was applied. After 20 days, the untreated shrubs appeared to be dry with some stress. After 33 days, the plants in the untreated holes were dead. Meanwhile, the treated shrubs remained healthy throughout.

In another experiment, the foregoing experiment was repeated using two additional Indian hawthorn plants and treating the soil with a layer 40 containing about 1½ liters of the hydrating materials 10 near the roots. In that experiment, after 20 days, the shrubs appeared healthy. At 33 days, the shrubs began to show a minimal amount of stress. At 40 days, the stressed plants were watered and responded well, returning to health and continued life.

In all of the foregoing experiment series, the particles 18 were of polyacrylamide, and the substrate 12 was sand. The polyacrylamide constituted approximately 5 percent by weight of the overall material 10. The particle size 18 was approximately a 60 mesh granularity.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for treating plants, the method comprising:
   providing a plant having roots defining a root region;
   providing a cavity having soil prepared to receive the plant;
   placing the plant on the soil in the cavity;
   providing an amendment, acting as a hydration-maintenance composition;
   the providing the amendment, further comprising providing a substrate formed as granules of a first material;
   the providing the amendment, further comprising coating each granule with a binder thereon;
   providing a second material comprising a polymer selected to be hydrophilic;
   the providing the amendment, further comprising comminuting the polymer to form a powder thereof comprising particles;
   the providing the amendment, further comprising coating a portion of the binder on each granule with the powder;
   surrounding the root region with a quantity of the granules;
   covering the root region and granules with a covering layer;
   providing water to the plant;
   hydrating of the hydrophilic polymer by the water;
   maintaining a portion of the water by the hydrophilic polymer until after the soil becomes too dry to sustain the plant;
   sustaining the plant by the hydrophilic polymer providing the portion of the water to the root region of the plant.

2. The method of claim 1, wherein the cavity is selected from a pot and a hole in a soil environment.

3. The method of claim 1, wherein the substrate is an inorganic material.

4. The method of claim 3, wherein the inorganic material is selected from sand, gravel, vermiculite, and perlite.

5. The method of claim 1, wherein the polymer is polyacrylamide.

6. The method of claim 1, wherein the binder securing the polymer to the substrate is selected from water, molasses, corn syrup, gelatin, another sugar, glue, and lignicite.

7. The method of claim 1, wherein the average maximum dimension of the particles is smaller than the average maximum dimension of the granules and within one order of magnitude thereof.

8. The method of claim 1, further comprising delaying providing any additional water to the plant again until after the soil is substantially too dry to sustain the plant.

9. The method of claim 8, further comprising hydrating of the root region of the plant, by the hydrophilic polymer, during the entirety of the delaying, at a rate sufficient to prevent any readily visible symptoms of dehydration stress to the plant.

10. The method of claim 8, further comprising providing water to the granules and delaying again watering corresponding in duration to the first delaying, with a resulting continued healthiness of the plant therethroughout.

11. A method of preparing a plant bed, the method comprising:
provide a substrate formed as granules, each having an exterior surface;
providing a hydrophilic material
comminuting into powder the hydrophilic material to a size smaller than the size of the granules;
coating the granules with a binder in an amount effective to bind the powder to the granules and ineffective to bind the granules to one another;
coating the granules with the particles resulting in the granules containing the particles on the exterior surfaces thereof;
providing a plant having roots a root region
preparing a cavity to receive the granules proximate the root region;
distributing the granules into the cavity to maintain hydration of the root region; and
providing water into the second soil and the granules therebelow.

12. A method of soil amendment, the method comprising:
providing a carrier, distinct from the soil, and formed as granules, each granule acting as a substrate;
the providing the carrier, wherein each granule has an exterior surface and an effective diameter, the granules collectively having a mean effective diameter;
selecting a hydrophilic polymer;
comminuting the hydrophilic polymer to a powder comprising particles;
selecting a binder;
adhering to the granules the binder
coating the binder on the granules with the particles of the powder
adhering the powder to the granules by the binder;
stabilizing the powder coating to fix the powder on the granules by curing the binder;
the stabilizing, wherein curing comprises at least one of drying and chemical reaction;
providing a plant having roots defining a root region;
preparing a cavity to receive the plant, the cavity comprising a first quantity of soil located proximate the root region;
selecting a quantity of the granules;
pouring the quantity of granules over at least a portion of the root region;
covering the root region and granules with a second quantity of soil; and
providing water into the second quantity of soil and percolating to the granules therebelow;
hydrating the granules by absorbing into the powder on the granules at least a first portion of the water provided;
providing to the roots by the hydrated granules, a second portion of the water out of the first portion thereof;
continuing to provide to the roots a third portion of the water out of the first portion thereof after the first and second quantities of soil have ceased providing water to the roots.

13. The composition of claim 12, wherein the carrier is selected from sand, gravel, vermiculite, and perlite.

14. The method of claim 13, wherein the carrier is sand having a mean effective diameter of the granules of from about one tenth millimeter to about 2 millimeters.

15. The method of claim 12, wherein the particles of the powder have a mean diameter less than the first effective diameter of the granules.

16. The method of claim 15, wherein the particles are of a size selected to be from about 30 mesh to about 100 mesh.

17. The method of claim 15, wherein the mean effective diameter of the particles is at least about an order of magnitude less than the mean effective diameter of the granules.

18. The composition of claim 12, wherein the polymer is a synthetic polymer selected to form a gel when exposed to water.

19. The composition of claim 18, further comprising a binder selected from molasses, corn syrup, gelatin, another sugar, glue, lignicite, and water.

20. The composition of claim 19, wherein the polymer is selected to have a porosity preferentially binding water to the particles thereof, substantially eliminating leaching of water into the soil surrounding the polymer, and releasing water to the root of the plant in preference to maintaining the water in the polymer.

* * * * *